Patented Dec. 4, 1973

3,776,951
PRODUCTION OF TETRAMETHYL
SUBERIC ACID
Harry Failey, Keyingham, and Bertram Yeomans, Hessle, England, assignors to BP Chemical International Limited, Great Britain
No Drawing. Filed July 11, 1972, Ser. No. 270,802
Claims priority, application Great Britain, July 15, 1971, 33,148/71
Int. Cl. C07c 51/14, 55/02
U.S. Cl. 260—533 A   13 Claims

ABSTRACT OF THE DISCLOSURE 2,2,7,7-tetramethyl suberic acid is made by reacting 2,7-dimethyloctene-4 with carbon monoxide in strong sulphuric acid, separating 2,2,7-trimethyloctanoic acid, feeding the 2,2,7-trimethyloctanoic acid to a rearrangement reaction with strong sulphuric acid to give 2,2,7,7-tetramethyl suberic acid, feeding the rearrangement product in strong sulphuric acid to the carbonylation zone, and recovering 2,2,7,7-tetramethyl suberic acid from the carbonylation product.

---

The present invention relates to the production of 2,2,7,7-tetra-methyl suberic acid.

It is known from Belgian Pat. 735,340 that 2,2,7,7-tetramethyl suberic acid (TMS) may be made by reacting 2,7-dimethyl octene-4 (DMO) with carbon monoxide and water in the presence of a strong acid catalyst, for example concentrated sulphuric acid. 2,2,7-Trimethyl octanoic acid (TMO) is also produced. The TMS and TMO can be separately isolated from the strong acid reaction mixture by diluting this with water in two stages, and the TMO can be converted to additional TMS, by reaction with additional concentrated sulphuric acid, where it undergoes re-arrangement to TMS as described in B.P. 1,270,939. Both steps of this process require large amounts of sulphuric acid, for instance 0.5 to 6 volumes per volume of olefin feed, of a concentration which is preferably not less than 95% by weight and is most preferably between 97% and 100% by weight. Although the diluted sulphuric acid, which results from the isolation of the products after both steps of the process, can be re-concentrated, this is an expensive process and the cost of providing the concentrated sulphuric acid forms a substantial part of the total costs of this process.

It has been found that a substantial economy, in the amounts of concentrated sulphuric acid used, can be achieved by continuously feeding part or all of the re-arrangement reaction product as catalyst to the carbonylation reaction.

According to the present invention the process for the production of 2,2,7,7-tetramethyl suberic acid comprises continuously feeding 2,7-dimethyl octene-4, carbon monoxide, and aqueous sulphuric acid having a concentration in the range 90 to 97% by weight to a carbonylation reaction zone to produce 2,2,7-trimethyl octanoic acid, continuously separating the 2,2,7-trimethyl octanoic acid from the carbonylation reaction product, feeding 2,2,7-trimethyl octanoic acid into contact with sulphuric acid having a concentration in the range 94% to 99.5% by weight in a re-arrangement reaction to product 2,2,7,7-tetramethyl suberic acid, continuously feeding to the carbonylation reaction zone as part or all of the sulphuric acid feed at least part of the re-arrangement reaction product containing 2,2,7,7-tetramethyl suberic acid and concentrated sulphuric acid concentration in the range 90% to 97% by weight, and recovering 2,2,7,7-tetramethyl suberic acid from the carbonylation reaction product.

OLEFIN FEEDSTOCK

The olefin 2,-dimethyloctene-4 may be fed to the carbonylation reaction in solution in a solvent such as a perchlorinated olefin or paraffin containing up to 4 carbon atoms, for instance tetrachloride or tetrachloroethylene.

CARBONYLATION REACTION

Although it is possible to introduce fresh sulphuric acid catalyst into the carbonylation reaction, in practice it is preferred that the whole of the acid catalyst for the carbonylation reaction is provided by recycling part or all of the re-arrangement reaction product, if necessary after dilution with water to give a sulphuric acid concentration in the range 90% to 97% by weight. This may be carried out by adding water to the re-arrangement reaction product or separately to the carbonylation reaction mixture to give the desired acid concentration. Preferably the sulphuric acid concentration is between 90% and 95% by weight.

The reaction of the DMO and carbon monoxide may be carried out over a moderately wide range of temperatures for example from 0° to 100° C., preferably from 15° to 35° C.

The carbonylation reaction may for example be carried out with total pressures in the range 1 to 200 atmospheres but it is preferred to use pressures of 10 to 100 atmospheres.

The residence time in the carbonylation reaction may vary over a moderately wide range. Examples of suitable times are those in the range 1 to 12 hours, preferably from 2 to 6 hours.

The carbonylation reaction may be carried out in any convenient form of apparatus which enables adequate contact between the reactants to be obtained. Suitably the reaction is carried out in a stirred tank reactor capable of operating at increased pressures to which reactants are fed, and products removed, continuously, or in a plurality of such reactors with the product from one reactor being fed into another for reaction with further quantities of carbon monoxide and/or olefins.

RECOVERY OF REACTION PRODUCTS

The TMO and TMS are continuously separated from the carbonylation reaction product in any suitable manner. In one method sufficient water is added to the reaction product to dilute the sulphuric acid to a concentration of about 60% by weight, which causes both the TMO and the TMS to form a separate liquid phase which can then be decanted from the acid phase. The TMS may then separate by crystallisation from the TMO and it can then be isolated by filtration. The TMs isolated in this manner is contaminated with TMO which may then be separated more completely be re-crystallisation, as disclosed in British Pat. 1,276,642. In this method the mixture of TMO and TMS is dissolved in a carboxylic acid solvent such as acetic acid, TMS being obtained on re-crystallisation. A preferred method of separating the two product acids, described in Belgian Pat. 766,429 and U.S. Pat. application Ser. No. 136,609 filed Apr. 22, 1971, is to add only sufficient water to cause the TMO to form a separate liquid phase, e.g. to dilute the sulphuric acid to a concentration of about 90% by weight. The TMO phase is decanted and a further quantity of water is then added to the partially diluted strong acid phase to dilute the sulphuric acid to a concentration of below 80% by weight, preferably about 60% by weight, at which concentration the TMS forms a separate phase which is decanted.

RE-ARRANGEMENT REACTION

The TMO separated from the carbonylation reaction product is converted to TMS in a re-arrangement reaction by bringing it into contact with fresh sulphuric acid of a concentration of 94% to 99.5% by weight, preferably from 97% to 99% by weight. The amounts of sulphuric acid can vary over a moderately wide range for example from 5 to 20 moles per mole of TMO preferably from 8 to 18 moles per mole TMO.

The re-arrangement reaction can be carried out at temperatures from −15° to 80° C., but it is preferred to operate at temperatures of from −15° to 40° C. Temperatures over 80° C. should be avoided as oxidative side reaction may occur.

The reaction pressure is not critical, and it is convenient to operate at atmospheric pressure.

The residence time for the re-arrangement reaction may be for instance from 1 to 72 hours preferably from 3 to 24 hours.

The re-arrangement reaction can be carried out in any suitable manner, for example, batchwise or continuously. It is preferred to operate in a continuous manner.

The re-arrangement reaction product is recycled, at least in part e.g. 30 to 70% wt./wt., to the carbonylation reaction, after dilution with water if necessary to bring the sulphuric acid concentration to a value in the range 90% to 97% by weight. The remainder of the reaction product if any can be treated for the recovery of TMS by diluting the sulphuric acid to a concentration of below 80% by weight preferably about 60% by weight to cause the TMS to form a separate liquid phase which can then be decanted. The portion of the re-arrangement reaction product which is to be treated for the recovery of TMS is suitably combined with the carbonylation reaction product, after the latter has been treated to separate TMO, and all of the TMS is then recovered by dilution with water.

The invention is further described with reference to the following examples.

Example 1

A carbonylation reaction was carried out by feeding a mixture of TMS (9.4% by weight) in aqueous 95% by weight $H_2SO_4$ and a solution of DMO (36% by weight) in tetrachloroethylene separately at 59.6 and 58.1 ml./h. respectively (≡5.6 moles $H_2SO_4$/mole DMO) to a stirred (1,300 r.pm.) magnedrive autoclave charged with 95% by weight $H_2SO_4$ (632 g.) and TMS (65 g.) under a pressure of carbon monoxide (69 bar) at a temperature of 18.5° to 21.8° C. over a period of 18 h. After 6 hours product was continuously withdrawn (124 ml./h.) from the bottom of the autoclave and was continuously quenched with water (3.5 ml./h.) to give 91% by weight $H_2SO_4$ wtih respect to water content and this liberated TMO as a separate phase. After separation of the TMO the catalyst raffinate was quenched again with water (33.6 ml./h.) and the precipitated TMS was separated by filtration. The TMO (2.003 mole) and TMS (0.339 mole) make corresponded to a selectivity to carboxyl groups of 89% on the DMO used (3.01 mole).

A rearrangement reaction was then carried out by mixing the TMO with 99% by weight $H_2SO_4$ (10.3 moles $H_2SO_4$/mole TMO) and was stood for 24 hours at ambient temperature. Approximately half the reaction mixture was then used to catalyse the carbonylation step and the other half was worked up in the following manner. The mixture was diluted with water (to give aqueous 90% by weight $H_2SO_4$) and the liberated TMO phase was decanted before diluting further to 67% w./w. $H_2SO_4$ to precipitate the TMS. The unconverted TMO (5.9%) was recycled to the next rearrangement step. The TMS was separated from the catalyst raffinate by filtration and was water washed on the filter bed. After drying the TMS obtained corresponded to 100% selectivity on the TMO consumed.

A portion of the $H_2SO_4$ raffinate (1.13 mole) from the rearrangement step was rotary evaporated at temperatures from 135° to 235° C. at a pressure of 27 mbar for about 6 hours. The concentrate (1.105 mole) which assayed at 95.8% by weight $H_2SO_4$, corresponded to a recovery of 98% of the starting catalyst.

Example 2

A carbonylation reaction was carried out by feeding a mixture of TMS (9.1% by weight) in aqueous 95% by weight $H_2SO_4$ and a solution of DMO (36% by weight) in tetrachloroethylene separately at 45.7 and 57.6 ml./h. respectively (4.17 moles $H_2SO_4$/mole DMO) to a stirred (1,300 r.pm.) magnedrive autoclave charged with 391 g. of 95% by weight $H_2SO_4$ and 39 g. of TMS under a pressure of carbon monoxide (69 bar) at a temperature of 20.5° to 23° C. over a period of 24.5 hours. After 6 hours reaction product was continuously withdrawn (104.6 ml./hr.) from the bottom of the autoclave and was continuously quenched with water (2.3 ml./h.) to give 91% by weight $H_2SO_4$ with respect to the water content and this liberated TMO as a separate phase. After separation of the TMO the catalyst raffinate was quenched again with water (20 ml./hr.) and the precipitated TMS was separated by filtration. The TMO (2.96 mole) and TMS (0.22 mole) make corresponded to a selectivity to carboxyl groups of 85.4% on the DMO used (3.98 mole).

A rearrangement reaction was carried out by using the TMO with 97.5% by weight $H_2SO_4$ (9 mole $H_2SO_4$/mole TMO) and allowing the mixture to stand for 24 hours at ambient temperatures. Approximately half the reaction mixture was then used to catalyse the carbonylation step and the other half was diluted with water to give 90% by weight $H_2SO_4$. The liberated TMO phase was decanted before diluting further to 67% by weight $H_2SO_4$ to precipitate the TMS. The unconverted TMO (22.8%) was recycled to the next rearrangement step. After washing and drying the TMS obtained corresponded to 94% selectivity on the TMO consumed.

Example 3

A process was carried out as in Example 1. Approximately 90% by weight of the rearrangement reaction product was fed to the carbonylation reaction so that for every mole of DMO fed (dissolved in 2 moles tetrachloroethylene), 8–9 moles of 95% wf./wf. sulphuric acid, containing the product of rearranging 0.68 mole of TMO given in the table as "carboxylic acid recycle," were fed to the carbonylation reaction. The carbonylation conditions used and the results obtained are shown in Table 1.

TABLE 1

| | Reagents molar ratio | | | | Reaction | | | Moles of carboxylic acids [1] | | Percent selectivity [2] |
|---|---|---|---|---|---|---|---|---|---|---|
| Dur$^n$ (h.) | $H_2SO_4$ (95% w./w.) | DMO | Solvent | Carboxylic acid recycle | Pressure bar (p.s.i.g.) | Temp. (° C.) | Residence time (h.) | TMS | TMO | |
| 36 | 8.9 | 1 | 2 | 0.68 | 51 (750) | 21–34 | 6 | 33.5 | 77.7 | 77 |

[1] In carbonylation product per 100 moles of DMO used.
[2] Of conversion of DMO to carboxylic acids groups.

Example 4

An experiment was carried out as in Example 1. Only approximately 50% by weight of the rearrangement reaction product was fed to the carbonylation reaction so that for every mole of DMO fed (dissolved in 1–5 moles of tetrachloroethylene) 4.2 moles of 95% wt./wt. sulphuric acid containing the product of rearranging 0.37 mole of TMO, were fed to the carbonylation reaction. The carbonylation conditions used and the results obtained are shown in Table 2.

TABLE 2

| Durⁿ (h.) | Reagents molar ratio | | | | Reaction | | | Moles of carboxylic acids [1] | | Percent selectivity [2] |
|---|---|---|---|---|---|---|---|---|---|---|
| | $H_2SO_4$ (95% w./w.) | DMO | Solvent | Carboxylic acid recycle | Pressure bar (p.s.i.g.) | Temp. (°C.) | Residence time (h.) | TMS | TMO | |
| 25 | 4.2 | 1 | 1.5 | 0.37 | 69 (1,000) | 21–34 | 6 | 23.9 | 74.4 | 8 |

[1] In carbonylation product per 100 moles of DMO used.
[2] Of conversion of DMO to carboxylic acids groups.

Example 5

Comparative batchwise production of TMS according to Belgian Pat. 735,340 and B. P. 1,270,939.—A mixture of 2.7-dimethyloctene-4 (1 mole) and tetrachloroethylene (1 mole) are added to an autoclave (2 l.) containing 97% w./w. $H_2SO_4$ (8 moles) under stirring (1,500 r.p.m.) and an applied pressure of 515 p.s.i.g. (35.5 bar) of carbon monoxide over 4 hours at 19° to 29° C. The reaction product was then mixed with ice to dilute the catalyst to 50% w./w. $H_2SO_4$. The liberated neo-acids (freed from traces of sulphuric acid by washing with water) comprised TMS (0.392 mole) and TMO (0.176 mole).

The TMO (0.176 mole) was mixed with 97.5% w./w. $H_2SO_4$ (1.58 moles) at ambient temperature and the mixture was stood for 24 h., diluted to give 90% w./w. $H_2SO_4$ and the liberated residual TMO (0.039 mole) was separated by extraction with cyclohexane. The catalyst raffinate was then diluted to 67% w./w. $H_2SO_4$ with water and the precipitated TMS (0.063 mole) was separated by filtration.

The total TMS produced (0.455 mole) required the use of 9.58 moles of $H_2SO_4$ i.e. 21 moles $H_2SO_4$/mole TMS of which 17.5 moles were used in the carbonylation step. A similar mass balance on Example 1 gives a usage of 16.1 moles $H_2SO_4$/mole of TMS of which 13.1 moles were used in the carbonylation step.

A further mass balance check on Example 2 shows that 19.7 moles $H_2SO_4$/mole of TMS were used of which 12.8 moles were used in the carbonylation step.

Thus the above examples show that the title process requires less catalyst per unit production of TMS especially at the carbonylation step where the capital cost of the expensive high pressure reactor can be correspondingly reduced.

We claim:

1. The process for the production of 2,2,7,7-tetramethyl suberic acid which comprises continuously feeding 2,7-dimethyloctene-4, carbon monoxide, and aqueous sulphuric acid having a concentration in the range 90 to 97% by weight to a carbonylation reaction zone to produce 2,2,7-trimethyl octanoic acid, continuously separating the 2,2,7-trimethyl octanoic acid from the carbonylation reaction product, feeding the 2,2,7-trimethyl octanoic acid into contact with sulphuric acid having a concentration in the range 94 to 99.5% by weight in a rearrangement reaction to produce 2,2,7,7-tetramethyl suberic acid, continuously feeding to the carbonylation reaction zone as part or all of the sulphuric acid feed rearrangement reaction product containing 2,2,7,7-tetramethyl suberic acid and concentrated sulphuric acid, after dilution with water if necessary to give a sulphuric acid concentration in the range 90 to 97% by weight and recovering 2,2,7,7-tetramethyl suberic acid from the carbonylation reaction product.

2. The process according to claim 1 wherein the 2,7-dimethyloctene-4 is fed to the carbonylation reaction in solution in a chlorinated hydrocarbon solvent.

3. The process according to claim 1 wherein the concentration of the sulphuric acid fed to the carbonylation reaction zone is between 90% and 95% by weight.

4. The process according to claim 1 wherein the rearrangement reaction product is the sole source of sulphuric acid feed to the carbonylation reaction.

5. The process according to claim 4 wherein the sulphuric acid required for the carbonylation reaction is obtained by feeding from 30% to 75% wt./wt. of the rearrangement reaction product to the carbonylation reaction.

6. The process according to claim 1 wherein the molar ratio of sulphuric acid to olefin fed to the carbonylation reaction zone is from 3:1 to 9:1.

7. The process according to claim 1 wherein the carbonylation reaction is carried out at a temperature in the range 0° to 100° C.

8. The process according to claim 7 wherein the carbonylation reaction is carried out at a temperature in the range 15° to 35° C.

9. The process according to claim 1 wherein the carbonylation reaction is carried out at a pressure from 10 to 100 atmospheres.

10. The process according to claim 1 wherein the concentration of sulphuric acid in the rearrangement reaction is from 97% to 99% by weight.

11. The process according to claim 1 wherein the amount of sulphuric acid in the rearrangement reaction is in the range 8 to 18 moles per mole of 2,2,7-trimethyl octanoic acid.

12. The process according to claim 1 wherein the temperature in the rearrangement reaction is from −15° to 40° C.

13. The process according to claim 1 wherein a part of the rearrangement reaction product is combined with the carbonylation reaction product after this has been treated to recover the 2,2,7-trimethyl octanoic acid and the combined products treated to recover the 2,2,7,7-tetramethyl suberic acid.

References Cited

UNITED STATES PATENTS 3,703,549   11/1972   Yeomans _____ 260—533 A

JAMES A. PATTEN, Primary Examiner

R. D. KELLY, Assistant Examiner

U.S. Cl. X.R.

260—537 P